US006873296B2

(12) United States Patent

Langley et al.

(10) Patent No.: US 6,873,296 B2

(45) Date of Patent: Mar. 29, 2005

(54) MULTI-BAND VEHICULAR BLADE ANTENNA

(75) Inventors: Richard Jonathan Langley, Canterbury (GB); Tony Walbeoff, Whitstable (GB)

(73) Assignee: Harada Industry Co., Ltd. (JP)

( * ) Notice: Subject to any disclaimer, the term of this patent is extended or adjusted under 35 U.S.C. 154(b) by 0 days.

(21) Appl. No.: 10/465,594

(22) Filed: Jun. 18, 2003

(65) Prior Publication Data

US 2004/0036659 A1 Feb. 26, 2004

(51) Int. Cl.[7] .................................................. H01G 1/28

(52) U.S. Cl. ....................................... 343/705; 343/708

(58) Field of Search ................................. 343/705, 708

(56) References Cited

U.S. PATENT DOCUMENTS

| | | | | |
|---|---|---|---|---|
| 4,072,952 A | 2/1978 | Demko | 343/700 MS |
| 4,509,053 A | 4/1985 | Robin et al. | 343/708 |
| 5,111,211 A | 5/1992 | Dahlberg | 343/700 MS |
| 6,028,567 A | 2/2000 | Lahti | 343/895 |
| 6,040,803 A | 3/2000 | Spall | 343/700 MS |
| 6,181,282 B1 | 1/2001 | Gans et al. | 343/700 MS |
| 6,204,826 B1 | 3/2001 | Rutkowski et al. | 343/895 |

OTHER PUBLICATIONS

Search Report dated Mar. 28, 2003, for UK Application GB 0214150.5

*Primary Examiner*—Michael C. Wimer

(74) *Attorney, Agent, or Firm*—Dickstein, Shapiro, Morin & Oshinsky, LLP.

(57) ABSTRACT

A multi-band blade antenna for use on a vehicle is formed by patterning the metal on both sides of a printed circuit board. One side is patterned into low-frequency patch and ground elements, and the other side is patterned into high-frequency patch and ground elements. The length of the patterned patch element on the low-frequency side of the board approximates the length of the board, while the effective length of the high-frequency patch element is approximately twice as long. Tuning for the frequency bands of mobile telephones in different regions (for instance, the European Union, United States and Japan) is by means of differences in slot length in the patch member on the low-frequency side, and differences in separation between the patch and ground members on the high-frequency side. RLC components are affixed to the low-frequency side after patterning. The printed circuit board has a shape which, in a complementary housing, may add ornamentation to the exterior of a vehicle on which it is mounted.

19 Claims, 9 Drawing Sheets

Side B

Side A

Side A

Side B

Definition of measuring plane: Y-Z

Definition of measuring plane: X-Z

AZIMUTH PLANE PATTERN - 836 MHZ

PITCH PLANE PATTERN - 836 MHZ

ROLL PLANE PATTERN - 836 MHZ

AZIMUTH PLANE PATTERN - 1880 MHZ

PITCH PLANE PATTERN - 1880 MHZ

ROLL PLANE PATTERN - 1880 MHZ

FIGURE 14A
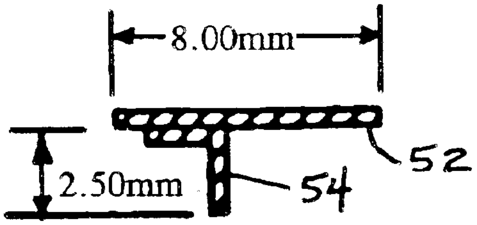
FIGURE 14B
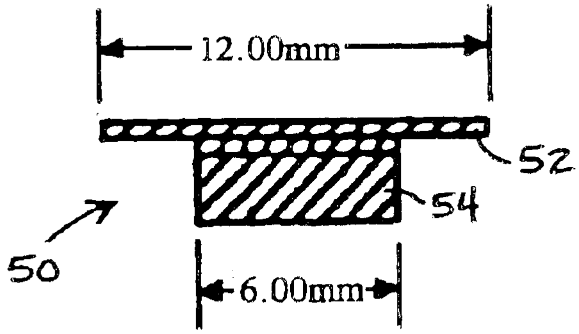
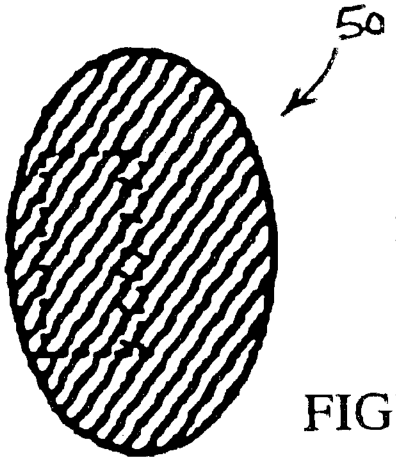
MATERIAL - 0.5mm BRASS
FIGURE 14C

MULTI-BAND VEHICULAR BLADE ANTENNA

This invention relates to a vehicular antenna, and more particularly, to a multi-band blade antenna mountable on a vehicle.

Conventional antennas for vehicles are mast antennas that are mountable, for instance, on the vehicle roof, and are monopoles typically a quarter-wavelength long. If two or more frequency bands are to be received, then two or more such mast antennas of different length normally need to be fitted to the vehicle.

One object of the preferred embodiment of the subject invention is to provide a vehicular antenna allowing more than one frequency band to be received and transmitted.

Another object of the preferred embodiment of the subject invention is to provide a vehicular antenna that may be manufactured easily and at low cost.

A still further object of the preferred embodiment of the subject invention is to provide a vehicular antenna which may add ornamentation to the vehicle.

The invention provides a multi-band vehicular blade antenna, comprising a generally-planar dielectric member adapted to form part of a vehicle and having respective metallic overlays on its two opposite faces, the two overlays being adapted to be connected, proximate one end of the antenna, to a vehicular grounding connection when the antenna is in an operative position on the vehicle, each overlay being associated with a respective operative frequency band of the antenna.

Each overlay may be configured to extend from the one end of the antenna toward the other end through a respective characteristic length that at least partially defines the respective operative frequency band of the antenna.

Preferably, the characteristic length of one of the overlays, adapted to be used for reception/transmission of a first frequency band lower than a second frequency-hand associated with the other overlay, approximates the length of the antenna between the one end and the other end of the antenna. More preferably, the other overlay has a characteristic length approximating to double the length of the antenna, at least a portion of the other overlay having a snaking configuration with reversing sections. Even more preferably, each of the reversing sections extends generally normal to the lengthwise direction of the antenna.

Preferably, the one overlay has a series of grooves formed in its one end, that end corresponding to the one end of the antenna, each of the grooves extending generally parallel to a lengthwise direction of the antenna and having dimensions that partially define the first frequency band. More preferably, the one overlay has two grooves. Even more preferably, that face of the dielectric member on which the one overlay sits also has a ground overlay proximate the one end of the antenna, the separation distance between the one overlay and the ground overlay partially defining the first frequency band. Yet more preferably, the one overlay and the ground overlay are connected by means of a set of electrical components which together partially define the first frequency band. Still more preferably, the set of electrical components includes a resistive element in parallel with a second element that consists of a serially-connected capacitive element and inductive element. The resistive element connects the ground overlay to the one overlay on one side of a first one of the grooves, and the second element connects the ground overlay to the one overlay on the other side of the first one of the grooves.

That face of the dielectric member on which the other overlay sits may also have another ground overlay proximate the one end of the antenna, the separation distance between the other overlay and the another ground overlay partially defining the second frequency band.

The antenna may be adapted to be mounted on an outside surface of a vehicle so as to extend outwardly from that surface, and wherein the grounding connection is to the outside surface of the vehicle.

Preferably, the dielectric member and the metallic overlays are formed as a printed circuit board. More preferably, the two overlays are adapted to be connected to each other proximate the one end of the antenna by means of a via-hole extending through the dielectric member.

Preferably, the antenna has a generally rectangular contour or a raked contour. With the raked contour, at least a portion of each side extends at an angle that is not normal to the one end of the antenna.

Preferably, a metallic plate is soldered to the other overlay at the other end of the antenna. The plate acts to broaden the bandwidth of the operative frequency band associated with the other overlay. More preferably, the metallic plate is configured so as to extend generally normal to the plane of the dielectric member.

The one frequency band may be the GSM-900 Band and the other frequency band may be the DCS-1800 Band.

Preferred features of the present invention will now be described, by way of example only, with reference to the accompanying drawings, in which.

Figure 7A:
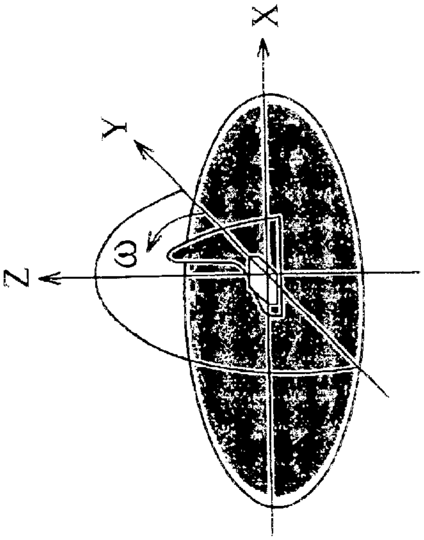
Figure 7B:
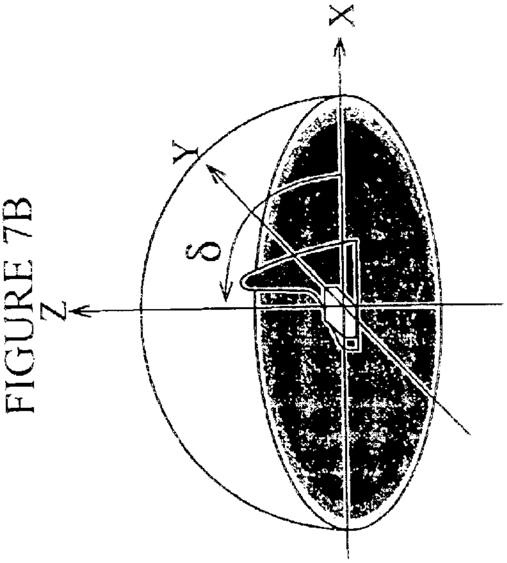
Figure 8:
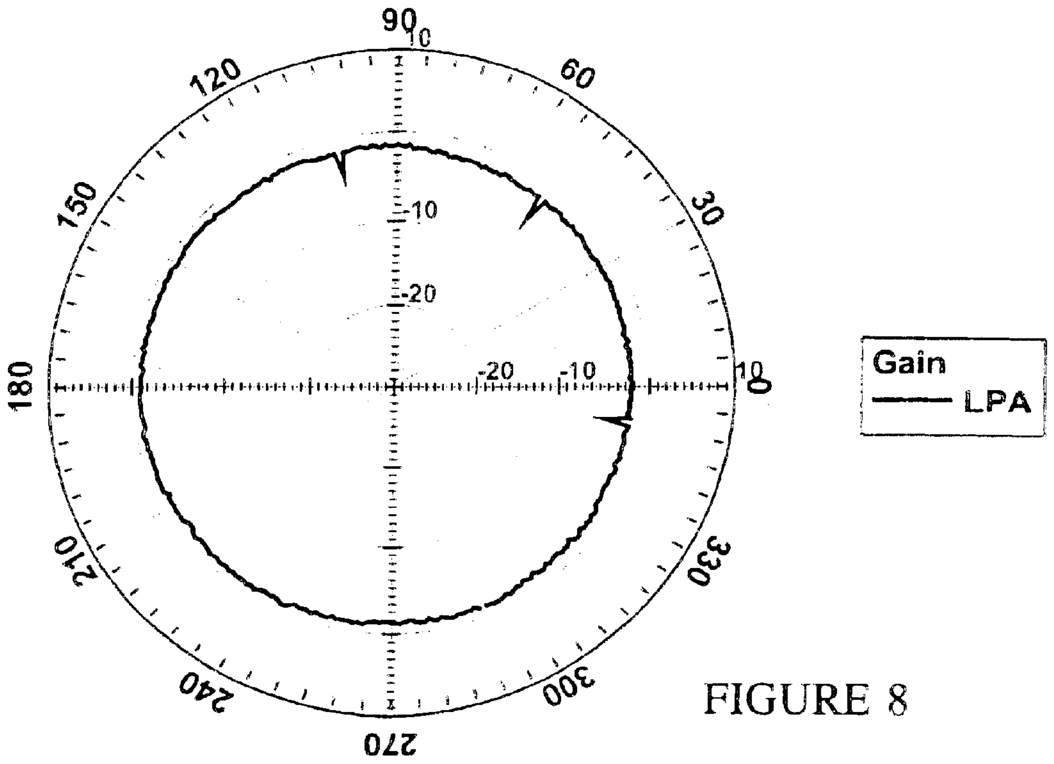
Figure 9:
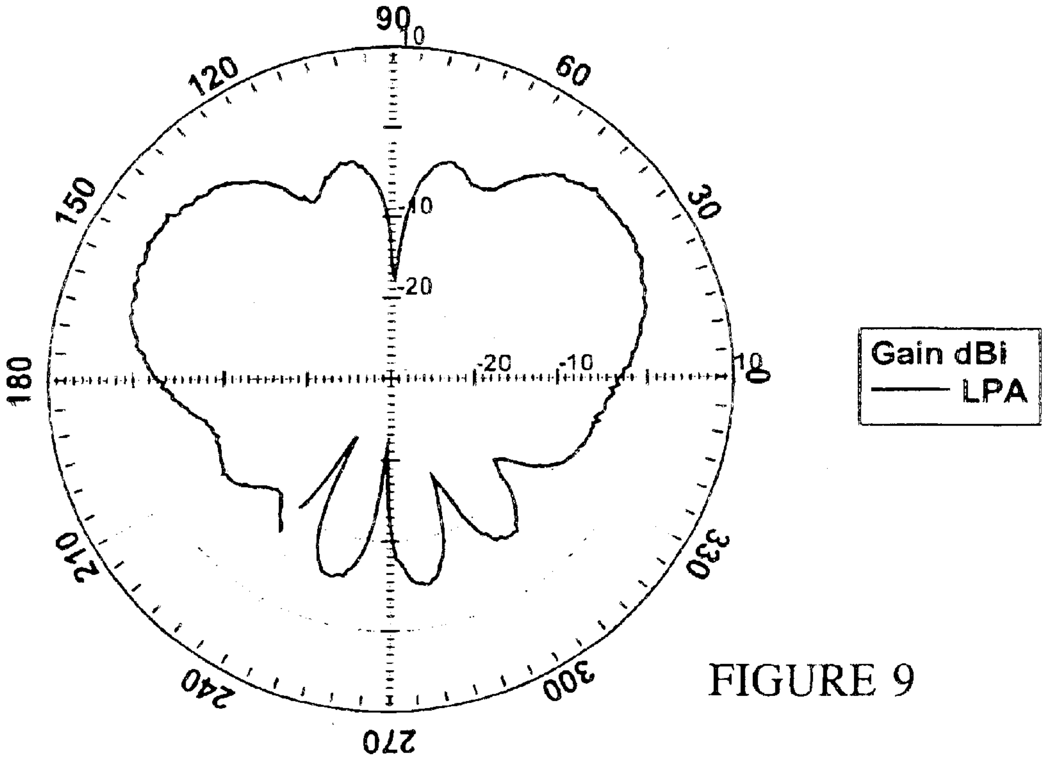
Figure 10:
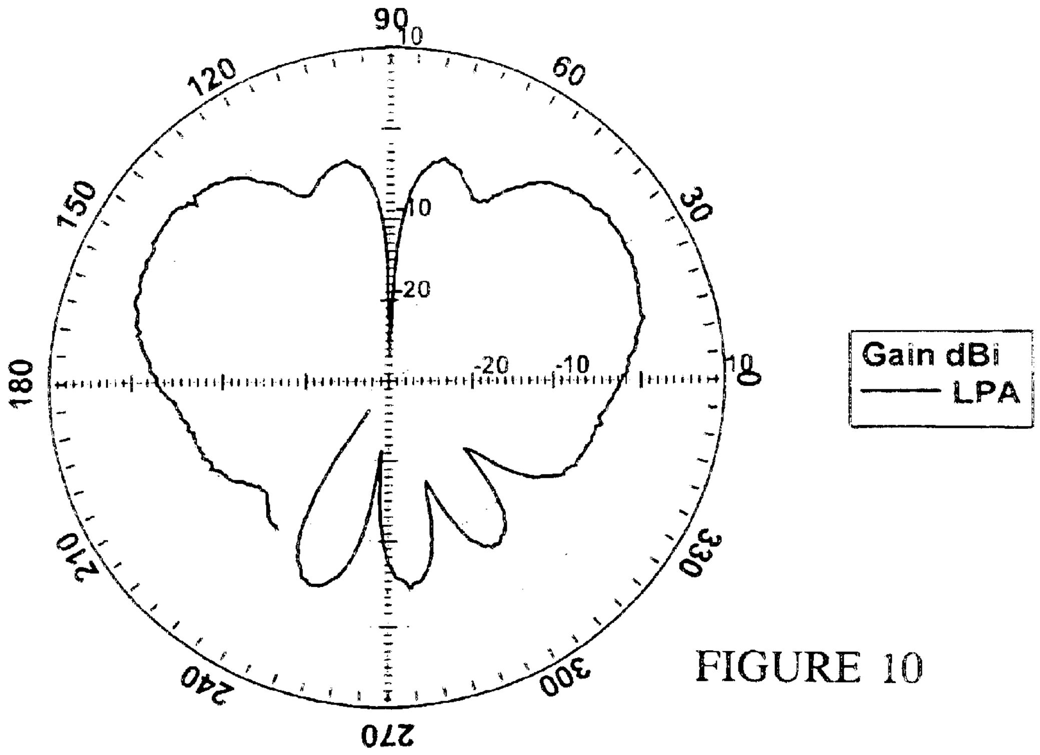
Figure 11:
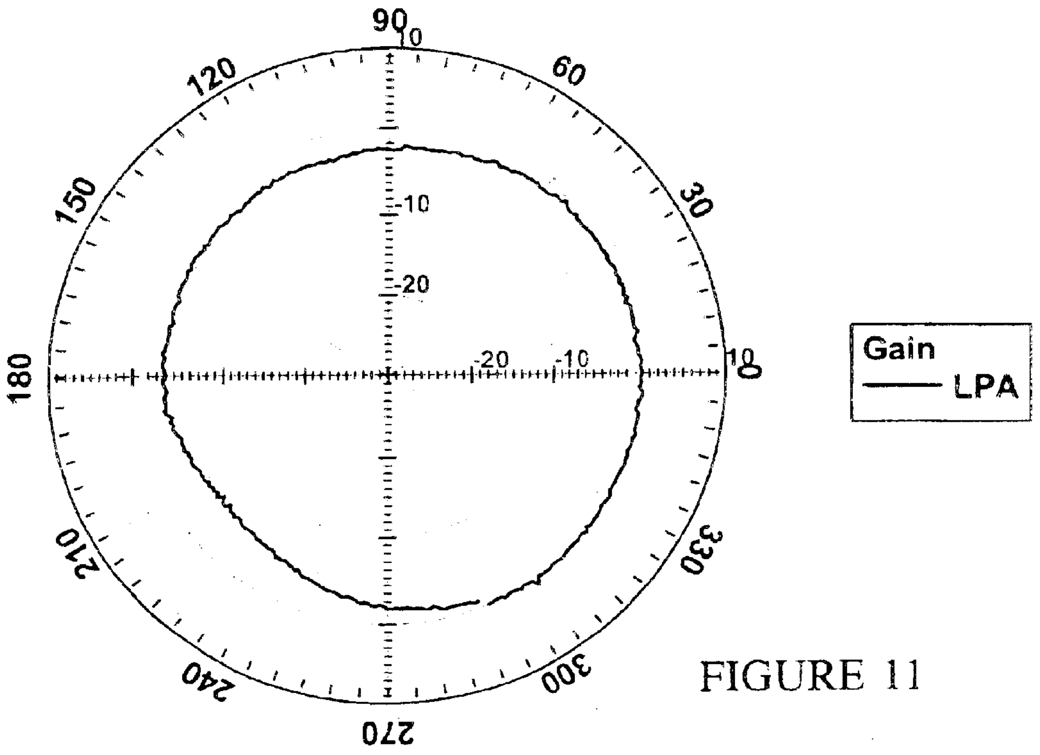
Figure 12:
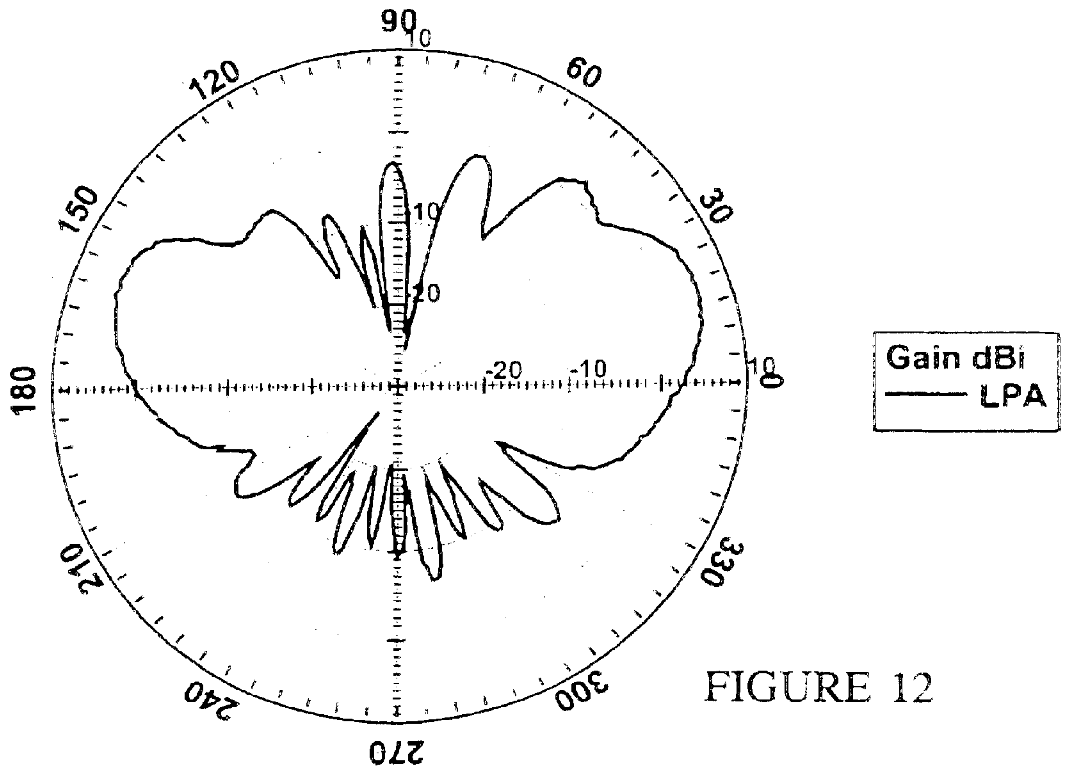
Figure 13:
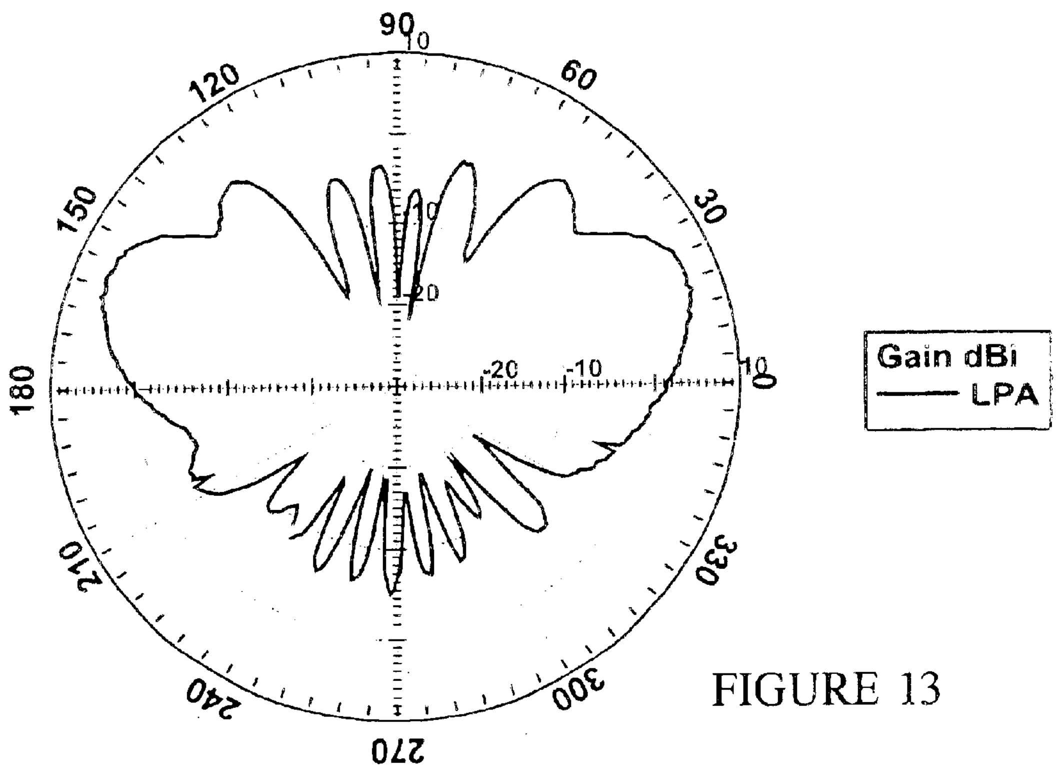
Figure 15A:
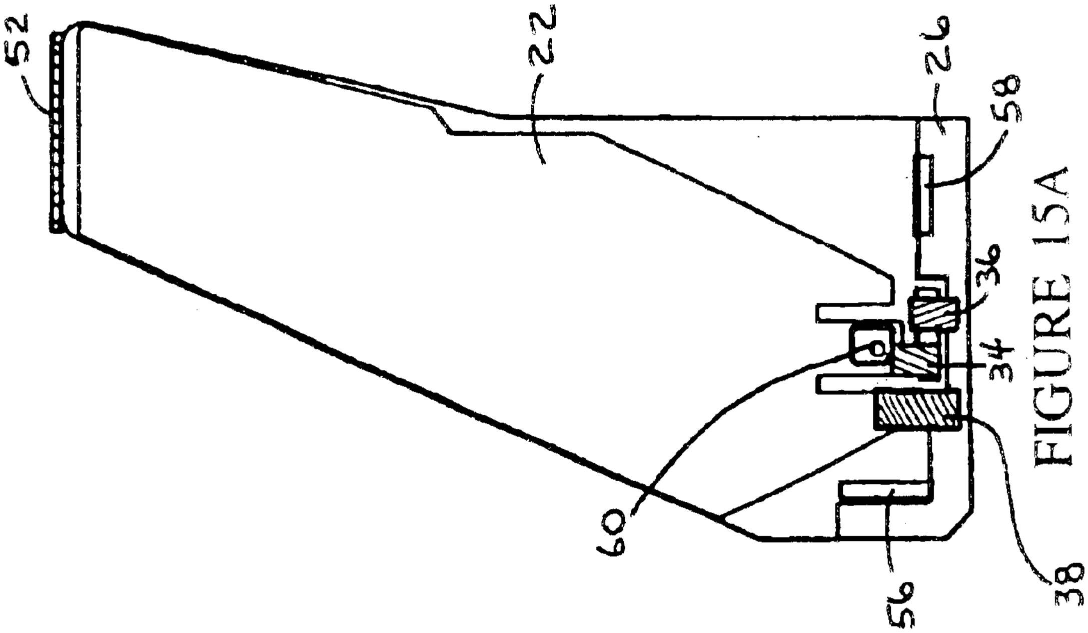
Figure 15B:
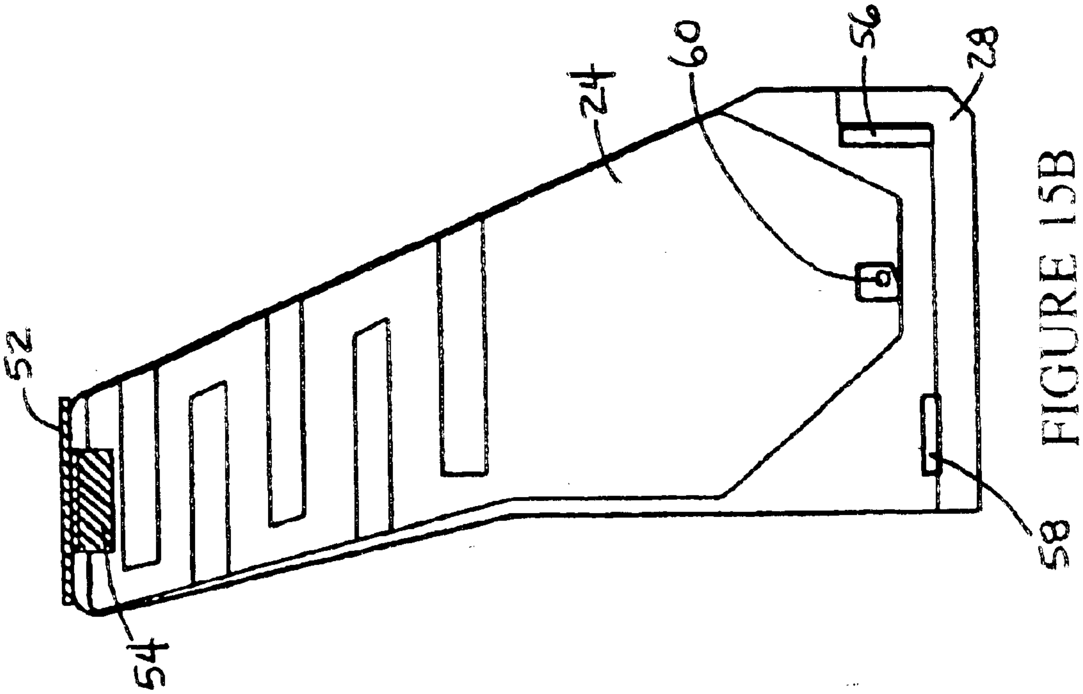

FIGS. 7A and 7B schematically illustrate the roll plane YZ and the pitch plane XZ for an antenna having a metallic overlay extending in the azimuth plane XY;

FIG. 8 is a typical radiation pattern at 836 MHz in the azimuth plane for Side A (the lower-frequency Side) of the antenna;

FIG. 9 is a typical radiation pattern at 836 MHz in the pitch plane for Side A of the antenna;

FIG. 10 is a typical radiation pattern at 836 MHz in the roll plane for Side A of the antenna;

FIG. 11 is a typical radiation pattern at 1880 MHz in the azimuth plane for Side B (the higher-frequency side) of the antenna;

FIG. 12 is a typical radiation pattern at 1880 MHz in the pitch plane for Side B of the antenna;

FIG. 13 is a typical radiation pattern at 1880 MHz in the roll plane for Side B of the antenna; and, FIGS. 14A, 14B and 14C are respective end, side and top views of an elliptical metallic disc which is attached to Side B at the other end of the antenna to form a capacitive load to broaden the bandwidth on that side, and, FIGS. 15A and 15B illustrate Sides A and D, respectively, of another embodiment of the antenna of the invention, the antenna having plated slots on its printed circuit board.

Figure 1A:
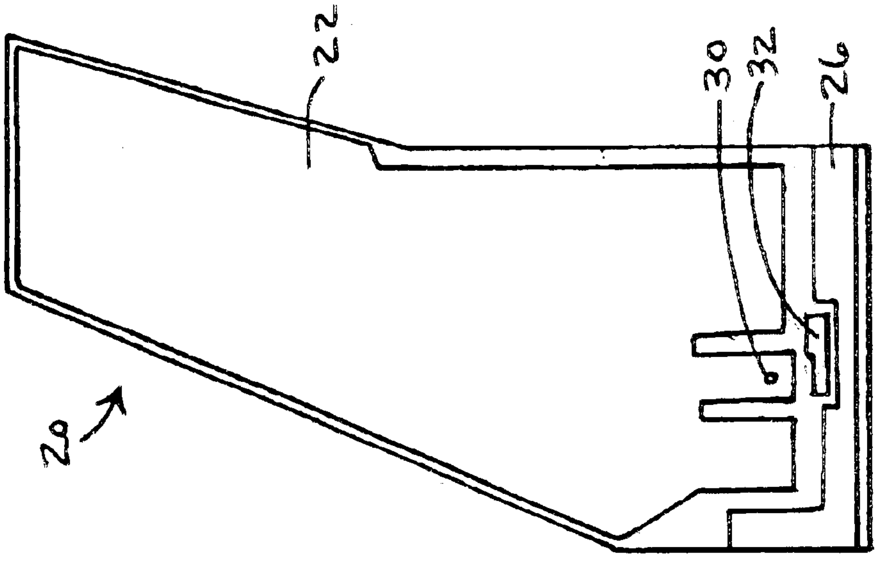
FIGS. 1A and 1B illustrate the metallic overlays on opposite sides of a printed circuit board used as part of a multi-band blade antenna in a preferred embodiment of the subject invention.
Figure 1B:
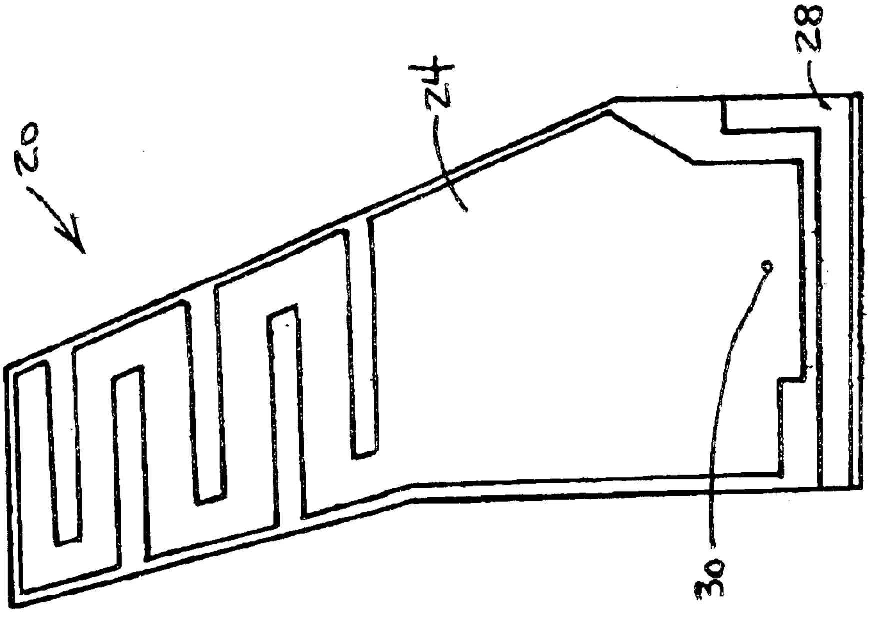

The antenna consists of a printed circuit board (pcb) having a printed metallic pattern on each side. The pcb is made of conventional glass-reinforced plastic material, and is typically 0.8 to 2.0 mm thick. In FIGS. 1A and 1B, the antenna has a 'raked' shape; however, that shape has no effect on the antenna function, and the antenna would function just as well if the sides were straight and vertical.

In FIGS. 1A and 1B, Sides A and B of pcb 20 have respective printed metallic elements. The larger elements are respective low-frequency and high-frequency antenna patches 22 and 24 of the antenna. The smaller elements, each spaced from a respective base of the patches 22 and 24, are respective ground members 26 and 28. A plated via-hole 30 extends through pcb 20 proximate a base of the patches 22 and 24. The via-hole 30 is adapted to receive an inner conductor of a coaxial cable or connector (not shown), which conductor is then soldered to the plated via-hole 30 so as to electrically connect to both of the patches 22 and 24. The ground members 26 and 28 are adapted to be connected to a mounting plate (not shown), which plate is used to mount the antenna 20 on a vehicle, the connection being such that when the antenna 20 has been so mounted, the ground members 26 and 28 electrically connect to a grounded section of the vehicle (such as the metallic outer skin).

Figure 2:
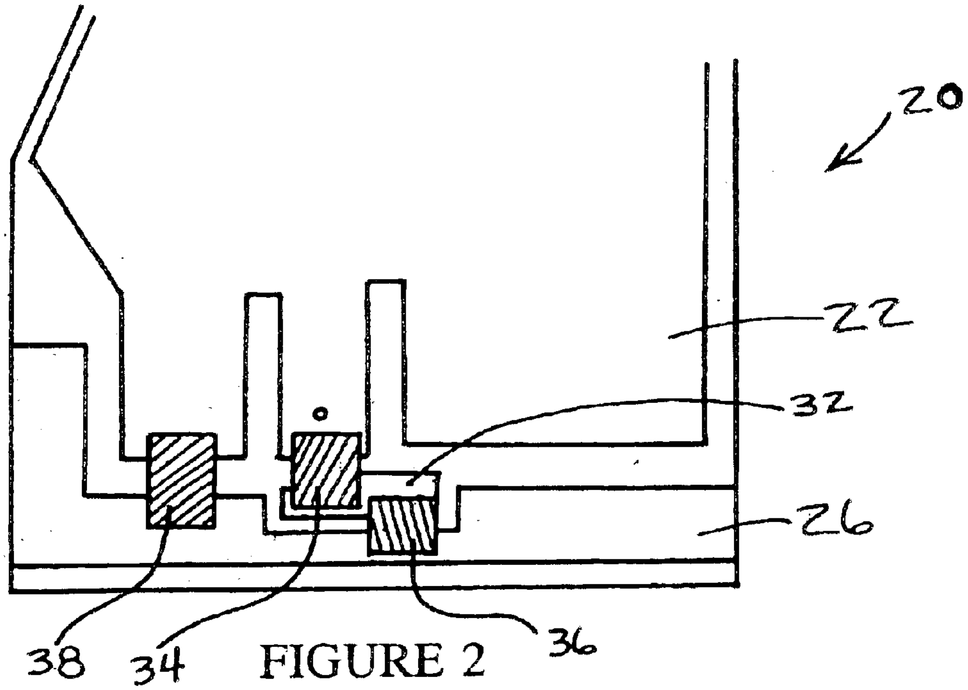
FIG. 2 illustrates one end of one side (designated Side A in FIG. 1(A)) of the printed circuit board, with three discrete circuit components added.

As shown in FIG. 1A, low-frequency Side A of pcb 20 also has a metallic island member 32 positioned intermediate of antenna patch 22 and ground member 26. As is shown in FIG. 2 and will be described in greater detail later, island member 32 is used to anchor a point of connection between two circuit components 34 and 36, which extend serially between antenna patch 22 and ground member 26. A third circuit component 38 extends directly between antenna patch 22 and ground member 26.

Although the antenna of this invention may be used in communication applications not related to telephones, the three pairs of frequency bands of interest for telephone use of the antenna are as follows:

| | Low-frequency band | High-frequency band | Region |
|---|---|---|---|
| (1) | 810 to 956 MHz | 1710 to 1880 MHz | Japan |
| (2) | 824 to 894 MHz | 1850 to 1990 MHz | U.S. |
| (3) | 890 to 960 MHz | 1920 to 2175 MHz | E.U. |

Typically, the following circuit components are selected for use with these pairs of frequency bands:

Circuit component 34

4.7 nH 0805-series chip inductor

Circuit component 36

220 pF 0805-series 50V NPO 5%-tolerance chip capacitor

Circuit component 38

10k 1206-series chip resistor (which, after installation and before installation of components 34 and 36, also allows diagnostic testing of the antenna).

When soldered into place on the metallic elements of pcb 20, the three circuit components 34, 36 and 38 define together a RLC resonant circuit. The physical size of the capacitive circuit component 36 and resistive circuit component 38 are determined by space constraints, and their size may be increased or decreased without having any effect on electrical performance. On the other hand, the physical size of the inductive circuit component 34 has a major impact on impedance matching, and requires careful selection. The values of the three circuit components may be varied to suit a particular pair of low-frequency and high-frequency hands.

Figure 3:
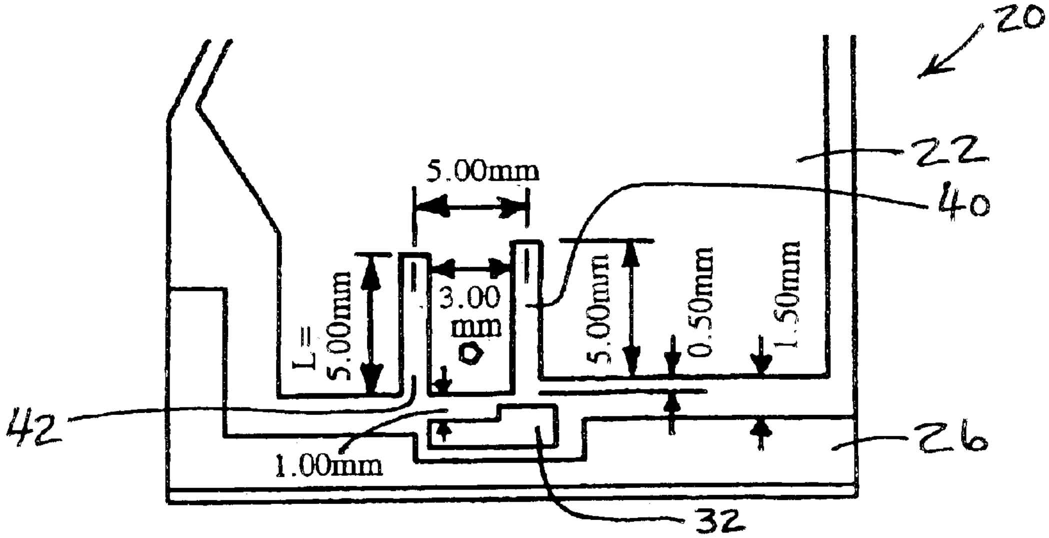
FIG. 3 illustrates the one end of Side A of the printed circuit board, with a metallic overlay on that side being configured for the antenna to receive frequency bands in use in the European Union.

Frequency bands are chosen not only by selection of the values of the three circuit components 34, 36 and 38, but also by the shape and mutual separation of the metallic elements, i.e. the shape of patch 22 and its distance from ground member 26 in respect of the low-frequency band, and the shape of patch 24 and its distance from ground member 28 in respect of the high-frequency band. With respect to the low-frequency band, one factor is the length (L), width and position of each of a pair of parallel slots 40 and 42 that extend into the low-frequency patch 22 from an inner end of that patch. The pair of slots 40 and 42 are shown in FIG. 3, which also shows the relative positioning of the inner end of patch 22 (the slots 40 and 42 extending therein) from the ground member 26 and the island member 32. The dimensions shown in FIG. 3, including the 5.00 mm-length of the slots 40 and 42, relate to the low-frequency band used for reception and transmission of mobile telephone calls within the European Union. Each of the slots 40 and 42 are 2.00 mm wide, and the proximate sides of the slots are separated by 3.00 mm. To the right of slot 40, the base of patch 22 is 0.5 mm above the inner edge of patch 22 on the left of slot 40; this results in the most proximate portion of island member 32 to patch 22 being 1.00 mm from patch 22 on the right of slot 40, but only 0.50 mm from patch 22 on the left of slot 40. Island member 32 has a step, as shown in FIG. 3, with right and left portions of island member 32 being respectively separated from patch 22 by 0.50 mm and 1.00 mm. On either side of the island member 32, the distance between the patch 22 and ground member 26 is 1.50 mm. The bottom and sides of the island member 32 are separated from the ground member 26 by 0.50 mm.

Figure 4:
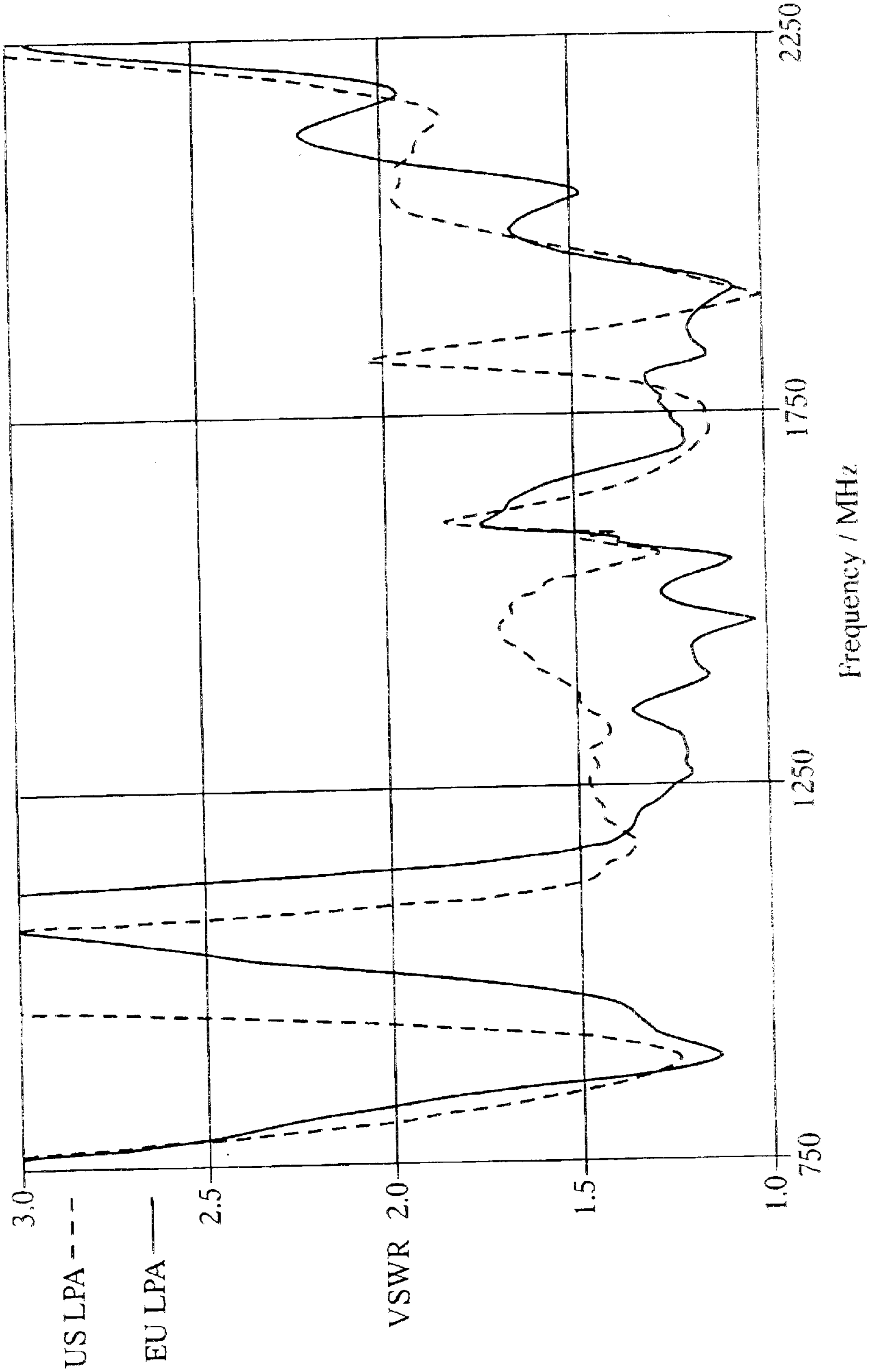
FIG. 4 illustrates a graph of voltage standing-wave ratio (VSWR) for antennas having different slot lengths 'L', where 'L' is shown in FIG. 3.

Changing the position and/or size of the slots 40 and 42 has little, if any effect, on the corresponding high-frequency band of the antenna element on the reverse side (Side B) of pcb 20; the slots 40 and 42 are only used for tuning the low-frequency band. With respect to the low-frequency band, changing the length 'L' of the slots 40 and 42 varies the inductance of the input impedance; if the slots are lengthened, inductance increases and the resonant frequency decreases. FIG. 4 shows the effect of a change in the length of slots 40 and 42 on the voltage standing-wave ratio (VSWR) of a low-frequency antenna.

Figure 6:
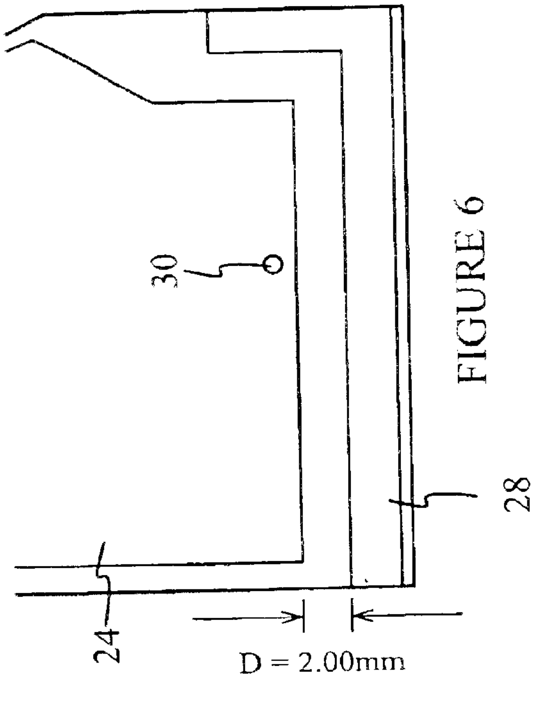
FIG. 6 illustrates the one end of Side B of the printed circuit hoard, with a metallic overlay on that side being configured for the antenna to receive frequency bands in use in the United States.

The high-frequency side of pcb 20 is tuned by varying the closest separation distance (D) between the patch 24 and the ground member 28 (see FIGS. 1B and 6). That distance is, for instance, 0.50 mm for the high-frequency band used for mobile telephone communication in the European Union. The frequency is also, of course, determined by the length of the high-frequency patch 24; from a comparison of FIGS. 1A and 1B, the high-frequency patch 24 can be seen to be approximately twice as long as the low-frequency patch 22. Thus, the length of the pcb 20, which approximates the length of low-frequency patch 22, is a factor on both the low- and high-frequency bands received by the antenna of this invention. Coupling between the sides of pcb 20 is a function of the thickness of pcb 20.

Figure 5:
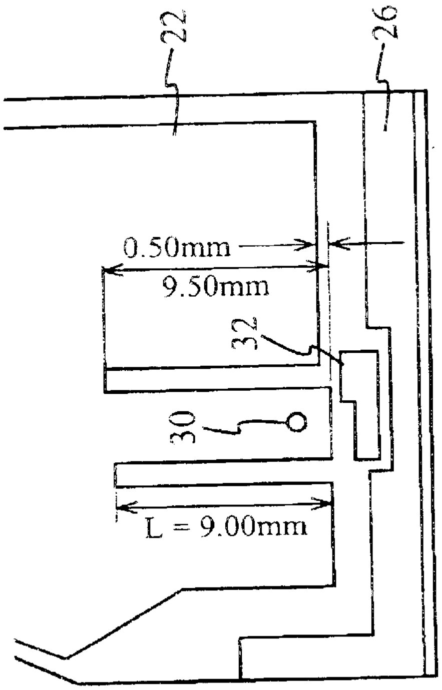
FIG. 5 is a similar figure to FIG. 3, but showing a metallic overlay that is configured to receive frequency bands in use in the United States.

FIGS. 5 and 6 respectively illustrate Sides A and B of the pcb 20 for a multi-band antenna to be used in the low- and high-frequency bands that are in use with mobile telephones in the United States. With respect to the U.S. low-frequency band, the length of the slots 40 and 42 is set at 9.00 mm; the other dimensions remain the same as those shown in FIG. 3 for the EU low-frequency band. Regarding the U.S. high-frequency band, the separation distance between the patch 24 and the ground member 28 is set at 2.00 mm instead of the 0.5 mm used for the EU high-frequency band.

FIGS. 7A and 7B illustrate measurement planes X-Y, Y-Z and X-Z used for showing orientation of the antenna transmission radiation patterns of FIGS. 8 to 13. The azimuth plane X-Y lies in the plane of the antenna, the pitch plane X-Z extends normal to the plane of the antenna and in the direction of the longitudinal axis of the antenna, while the roll plane extends normal to the plane of the antenna and in the direction of the lateral axis of the antenna.

FIGS. 8 to 10 respectively illustrate the azimuth, pitch and roll plane patterns for the low-frequency Side A of pcb 20. FIGS. 11 to 13 respectively illustrate the azimuth, pitch and roll plane patterns for the high-frequency Side B of the antenna. The azimuth plane patterns in FIGS. 8 and 11 can be seen to be relatively symmetrical. The low-frequency pitch and roll plane patterns in FIGS. 9 and 10 illustrate that the low-frequency radiation extends prominently from the low-frequency Side A of pcb 20, with only a small amount radiating from the high-frequency Side B; the high-frequency pitch and roll patterns in FIGS. 12 and 13 illustrate a corresponding effect for the high-frequency radiation, with the majority of that radiation extending from the high-frequency Side B of pcb 20.

The low- and high-frequency bands used for Japanese mobile telephone-communication require an increased bandwidth over that used in the European Union and the United States. To achieve such increased bandwidth, a brass disc element 50, consisting of a brass disc 52 soldered onto a brass mounting bracket 54, as illustrated in the end, side and plan views of FIGS. 14A, 14B and 14C, respectively, is soldered onto the outer end of the high-frequency patch 24 so as to extend normal to the plane of pcb 20. FIGS. 15A and 15B illustrate the low- and high-frequency sides of pcb 20 after the disc element 50 has been soldered onto patch 24. The addition of the disc element 50 increases both the low-frequency and high-frequency bandwidths by adding capacitive loading.

FIGS. 1A and 15B illustrate some other features. The patches 22 and 24 have a sloping contour on approach to respective ground members 26 and 28. Also shown are a pair of rectangular apertures 56 and 58 into which ground plugs (not shown) are adapted to be soldered to electrically connect ground members 26 and 28. The ground plugs are also connectable to a conductive support bracket (not shown) for holding pcb 20 at a fixed normal orientation relative to a plane of the bracket. The bracket is adapted to be conductively fitted onto a metallic surface of a vehicle so as to connect the ground members 26 and 28 of pcb 20 to the vehicle ground. In FIGS. 15A and 15B, a conductor 60 of a coaxial feed cable is shown soldered in position as it extends through the plated via-hole of pcb 20; the grounding shield (not shown) of the coaxial feed cable has been soldered to one of the ground members 26 and 28. As also shown in FIG. 15A, the three circuit components 34, 36 and 28 are soldered between the metallic surfaces of low-frequency Side A.

In summary, the pcb 20 used in the European Union, United States and Japan differ from each other as follows:

| | European Union | United States | Japan |
|---|---|---|---|
| ‘L’ value | 5.00 mm | 9.00 mm | 9.00 mm |
| ‘D’ value | 0.50 mm | 2.00 mm | 2.00 mm |
| Disc element | Not present | Not present | Present |

The antenna consisting of pcb 20 and mounted circuit components can be covered in a plastic or similar housing of complementary shape, and can be mounted on the outside of a vehicle to add ornamentation to the vehicle.

While the present invention has been described in its preferred embodiments, it is to be understood that the words which have been used are words of description rather than limitation, and that changes may be made to the invention without departing from its scope as defined by the appended claims.

Each feature disclosed in this specification (which term includes the claims) and/or shown in the drawings may be incorporated in the invention independently of other disclosed and/or illustrated features.

The text of the abstract filed herewith is repeated here as part of the specification.

A multi-band blade antenna for use on a vehicle is formed by patterning the metal on both sides of a printed circuit board. One side is patterned into low-frequency patch and ground elements, and the other side is patterned into high-frequency patch and ground elements. The length of the patterned patch element on the low-frequency side of the board approximate the length of the board, while the effective length of the high-frequency patch element is approximately twice as long. Tuning for the frequency bands of mobile telephones in different regions (for instance, the European Union, United States and Japan) is by means of differences in slot length in the patch member on the low-frequency side, and differences in separation between the patch and ground members on the high-frequency side. RLC components are affixed to the low-frequency side after patterning. The printed circuit board has a shape which, in a complementary housing, may add ornamentation to the exterior of a vehicle on which it is mounted.

What is claimed is:

1. A multi-band vehicular blade antenna adapted to be attached by one end so as to form part of a vehicle, the antenna comprising a generally-planar dielectric member with two opposite faces each having a metallic overlay, each overlay forming a radiator element allowing communication on a respective one of two operative frequency bands, each overlay being adapted to be electrically connected, proximate one end of the member, to a vehicular grounding connection when the antenna is in an operative position on the vehicle, the overlays being configured to extend from the one end of the member toward the other end through respective different characteristic lengths, each characteristic length at least partially defining a respective one of the two operative frequency bands.

2. A multi-band antenna as in claim 1, wherein the characteristic length of the first overlay, adapted to be used for reception/transmission of a first frequency band lower than a second frequency band associated with the second overlay, approximates the length of the member from its one end to its other end.

3. A multi-band antenna as in claim 2, wherein the second overlay has a characteristic length approximating to double the length of the member, at least a portion of the other overlay having a snaking configuration with reversing sections.

4. A multi-band antenna as in claim 3, wherein each of the reversing sections extends generally normal to the lengthwise direction of the member.

5. A multi-band antenna as in claim 2, wherein the first overlay has a series of grooves formed in its one end, proximate the one end of the member, each groove extending generally parallel to a lengthwise direction of the member and having dimensions that partially define the first frequency band.

6. A multi-band antenna as in claim 5, wherein the first overlay has two grooves.

7. A multi-band antenna as in claim 5, wherein the member face on which the first overlay sits also has a first ground overlay proximate the one end of the member, a separation distance between the first overlay and the first ground overlay partially defining the first frequency band.

8. A multi-band antenna as in claim 7, wherein the first overlay and the first ground overlay are connected by means of a set of electrical components which together partially define the first frequency band.

9. A multi-band antenna as in claim 8, wherein the set of electrical components comprises a resistive element in parallel with a second element, the second element comprising a serially-connected capacitive element and inductive element, the resistive element connecting the first ground overlay to the first overlay on one side of a first one of the grooves, and the second element connecting the first ground overlay to the first overlay on the other side of the first one of the grooves.

10. A multi-band antenna as in claim 5, wherein the member face on which the second overlay sits has a second ground overlay proximate the one end of the member, the separation distance between the second overlay and the second ground overlay partially defining the second frequency band.

11. A multi-band antenna as in claim 1, wherein the antenna is adapted to be mounted at a position on an outside surface of a vehicle body so as to extend outwardly from that surface, the vehicle body at that position acting as a grounding point for the mounted antenna.

12. A multi-band antenna as in claim 1, wherein the dielectric member and the metallic overlays form a printed circuit board.

13. A multi-band antenna as in claim 12, wherein the two overlays are adapted to be connected to each other proximate the one end of the dielectric member by means of a via-hole that extends through the member.

14. A multi-band antenna as in claim 1, wherein the antenna has a generally rectangular contour.

15. A multi-band antenna as in claim 1, wherein the antenna has a raked contour in which at least a portion of each front and back side extends at an angle that is not normal to the one end of the antenna.

16. A multi-band antenna as in claim 3, further comprising a metallic plate soldered to the second overlay at the other end of the member, the plate acting to broaden the bandwidth of the operative frequency band associated with the second overlay.

17. A multi-band antenna as in claim 16, wherein the metallic plate is configured so as to extend generally normal to the plane of the dielectric member.

18. A multi-band antenna as in claim 17, wherein the first and second overlays are adapted to be connected to each other proximate the one end of the dielectric member by means of one or more plated slots extending through the member.

19. A multi-band antenna as in claim 1, wherein one of the frequency bands is the GSM-900 Band and the other frequency band is the DCS-1800 Band.

* * * * *